(No Model.)

C. M. WILLIAMS.
COMBINATION COTTON PLOW.

No. 464,541.  Patented Dec. 8, 1891.

Witnesses:
H. B. Bell
W. L. Lawrence

Inventor:
Chas. M. Williams

UNITED STATES PATENT OFFICE.

CHARLEY MABRY WILLIAMS, OF MILAM, TEXAS.

COMBINATION COTTON-PLOW.

SPECIFICATION forming part of Letters Patent No. 464,541, dated December 8, 1891.

Application filed August 10, 1891. Serial No. 402,317. (No model.)

*To all whom it may concern:*

Be it known that I, CHARLEY MABRY WILLIAMS, a citizen of the United States, residing at Milam, in the county of Milam and State of Texas, have invented a Combination Cotton-Plow; and I do hereby declare that the following is a full, clear, and exact description of the invention, which will enable others skilled in the art to which it appertains to make and use the same.

Heretofore most cotton has been barred with a turn-plow and then swept, making four trips to the row, before being chopped, while my invention does the work with two furrows, if used on a single plow-stock or one trip to the row if used on a cultivator, and greatly lightens the hoeing. It also leaves the land in better shape to plow afterward. While plants of any kind are too small to plow with ordinary plows, they can be profitably plowed with my invention, for the cutting-fender can be raised and the heel-sweep lowered, thereby enabling it to cut very close to small plants without covering them.

Figure 1:
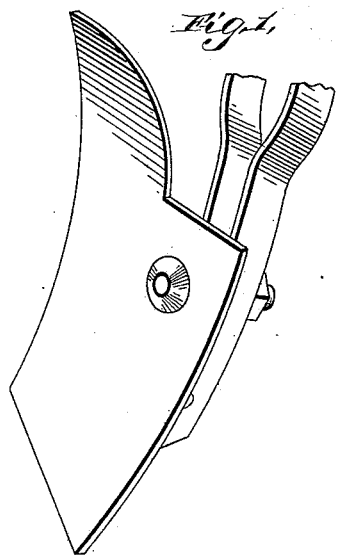
Figure 3:
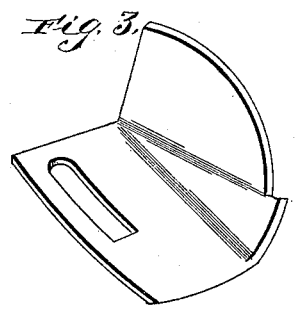
Figure 4:
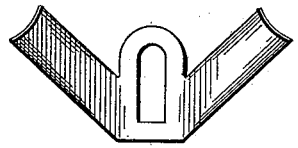
Figure 2:
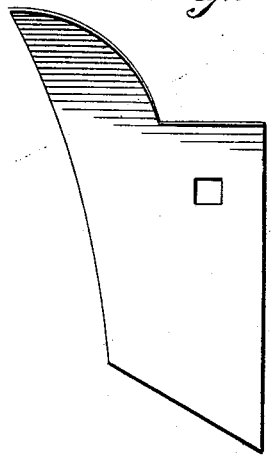

In the drawings, Figure 1 shows a suitable shovel attached to a standard. Fig. 2 shows the shovel detached. Fig. 3 shows a cutting-fender, and Fig. 4 shows a heel-sweep.

My combination consists of a half-shovel, a cutting-fender, and a heel-sweep, all used at once on a single plow-stock or cultivator. The half-shovel can be made to throw the dirt to the left, in which case the cutting-fender is constructed to be placed on right side of plow-stock.

Instead of the cutting-fender and heel-sweep having square holes, they contain slot holes for the heel-bolt, which admit of both cutting-fender and heel-sweep being adjustable either up or down, as the case may require.

The fender is made of steel and is about two-thirds the length of the half-shovel, about the thickness of an ordinary sweep, and is placed on top and next to the plow-foot. It extends to or near the right side of plow-foot, and then extends straight to the left till it intersects the bar side of half-shovel. Then it cups or bends slightly upward. The lower edge of fender from the bar of half-shovel is sharp and extends a short distance to the left, with a sufficient angle or slope to shed all trash, vegetation, &c. From there it bends nearly straight up, and the edge is sharp and oval in shape back to a line even with the upper end of bar of half-shovel. From there (not sharp) straight down, or as near as may be, to the upper end of the half-shovel bar. The heel-sweep is somewhat on the order of the ordinary heel-sweep or buzzard-wing sweep, but is constructed so as to take the ground from point to point, and by means of the slot-hole may be raised or lowered to throw more or less dirt, as may be desired.

What I claim, and desire to secure by Letters Patent of the United States, is—

1. A cutting-fender consisting of the main body with a slot $b$, the landward extension beyond the shovel curved upward and having a cutting lower edge, and the outer portion bent to a vertical plane and having a curved or convex cutting-edge serving as a colter, substantially as shown and described.

2. The cutting-fender, as herein shown and described, in combination with the adjustable heel-sweep, a shovel or scraper, and a plow-stock, as set forth.

CHARLEY MABRY WILLIAMS.

Witnesses:
 H. B. BELT,
 W. H. BELT.